Patented June 24, 1952

2,601,665

UNITED STATES PATENT OFFICE 2,601,665

THERMOSETTING RESINS AND PROCESS OF PREPARING SAME

George E. Niles, Winchester, Mass., assignor to Monsanto Chemical Company, St. Louis, Mo., a corporation of Delaware No Drawing. Application October 29, 1949, Serial No. 124,491

20 Claims. (Cl. 92—21)

The present invention relates to novel thermosetting resins and to processes for preparing such resins. This invention more particularly relates to novel thermosetting resins which are suitable for addition to paper pulp in the beater for the production of paper sheeting having a high wet strength. This invention also relates more particularly to processes for the production of improved thermosetting resins which are suitable for imparting wet strength characteristics to paper products.

It is one object of the present invention to provide novel nitrogen-containing thermosetting resins.

A further object of this invention is to provide water-soluble and highly condensed thermosetting resins which are characterized by good stability in aqueous solutions, and which are capable of imparting improved wet strength to paper products in which they are incorporated.

A further object of this invention is to provide simple and efficient processes for the preparation of improved, water-soluble and highly condensed thermosetting resins.

Still further objects and advantages of this invention will be apparent from the following description and the appended claims.

The objects of this invention are attained, in general, by reacting, in water, an amino compound containing from 1 to 6 carbon atoms and the grouping

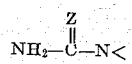

in which Z is selected from the group consisting of O, S and N—, and N< represents a nitrogen atom having 2 single valences attached to separate atoms or where the two valences represent a double bond attached to the same atom, for example, urea or melamine, an aldehyde such as formaldehyde and a water-soluble salt of a nuclear substituted hydroxy aromatic sulfonic acid containing from 6 to 10 carbon atoms, in which acid the hydroxy and sulfonic acid groups are the sole substituents other than carbon and hydrogen, for example, a salt such as sodium phenol sulfonate. The reaction is allowed to proceed until the resulting resin contains aromatic sulfonate residues as part of the resin molecule.

The proportions of the amino compound, the aldehyde and the water-soluble salt of the hydroxy aromatic sulfonic acid used may be varied widely depending upon the end use of the resinous products. Thus, it is possible, for example, to employ from 0.5 to 2 molecular proportions of the aldehyde for each amino group in the amino compound and from 0.03 to 1 molecular proportion of the salt of the hydroxy aromatic sulfonic acid for each molecular proportion of the amino compound. Smaller and larger amounts of the aldehyde and such salt may also be used in some instances. In those instances where it is desired to prepare water-soluble resins it is generally desirable to use from 2 to 6 molecular proportions of formaldehyde and from 0.05 to 1 molecular proportion of the salt of the hydroxy aromatic sulfonic acid for each molecular proportion of the amino compound.

As examples of suitable water-soluble salts of the hydroxy aromatic sulfonic acids which come within the scope of the compounds hereinbefore defined may be mentioned the sodium salts of the phenol sulfonic acids such as para phenol sulfonic acid and/or ortho phenol sulfonic acid; sodium salts of mixtures of ortho, meta and para (o, m and p) phenol sulfonic acids and mixtures of ortho and para phenol sulfonic acids preferably those mixtures in which the para isomer is the predominant compound; sodium salts of 2 naphthol-3,6 disulfonic acid; sodium salts of 1 naphthol-3,6 disulfonic acid and the like. Instead of the sodium salts other water-soluble salts are also used such as the other alkali metal salts, for example, the potassium, lithium and like salts. The preferred compounds for use in preparing the resinous products of this invention are the water-soluble salts of those hydroxy aromatic sulfonic acids, as hereinbefore defined, which are selected from the group consisting of monohydroxy benzene monosulfonic acids, for example, sodium ortho phenol sulfonate and sodium para phenol sulfonate, and the water salts of hydroxy naphthalene disulfonic acids, for example, a sodium salt of 2 naphthol-3,6 disulfonic acid. Of these compounds the sodium salt of ortho phenol sulfonic acid or para phenol sulfonic acid or the sodium salts of a mixture of o and p phenol sulfonic acids are preferred because of their low cost and commercial availability. They are also preferred in those instances where it is desired to prepare wet strength resins for use with paper because they enable the preparation of superior resins for this purpose.

The water-soluble salts of the hydroxy aromatic sulfonic acid may be added as such to the solution containing the amino compound and the aldehyde or the reaction product thereof, or the acid per se may be added to such solution together with a water-soluble base such as an alkali metal base, for example, alkali metal hydroxides or carbonates in an amount sufficient to neutralize such acid. Thus, the salt is formed in the solution in situ.

As examples of suitable amino compounds which come within the class of compounds hereinbefore defined may be mentioned, in addition to urea, such compounds as thiourea, cyanamide, dicyandiamide, guanidine and the like and, in addition to melamine, such generic compounds as the amino-triazines of which 2 chloro-4,6 di-amino-1,3,5 triazine and 2 hydroxy-4,6 diamino-1,3,5 triazine are specific examples. Mixtures of such amino compounds may also be used.

As examples of aldehydes which may be used may be mentioned, in addition to formaldehyde, benzaldehyde, furfural and such aliphatic aldehydes as acetaldehyde, propionaldehyde and the like and polymers of formaldehyde such as para formaldehyde. Formaldehyde or para formaldehyde are preferred, however, since they react more rapidly with the amino compounds and also yield reaction products therewith which have greater water-solubility than those prepared from other aldehydes.

The resinous products of this invention are suitably prepared by first reacting the amino compound and the aldehyde in an alkaline aqueous solution to form an aldehyde-amino compound condensation product having at least one

terminal grouping. In the case of formaldehyde a methylol group —CH$_2$—OH is formed in place of one of the hydrogens on the amino group of the amino compound. In the case of urea and urea type compounds, the pH of the solution is generally between about 7.0 and 8.5. In the case of amino-triazines such as melamine the pH of the solution is generally between 7.0 and 10.0. The reaction between the aldehyde-urea condensation products and the salt of the hydroxy aromatic sulfonic acid and the further condensation of the resulting product is carried out in an acid aqueous solution which, in general, has a pH between about 4.0 and 6.0. The aldehyde-melamine condensation products, on the other hand, are reacted with the salt of the hydroxy aromatic sulfonic acid and are further condensed, in an alkaline aqueous solution which, in general, has a pH between about 7.0 and 10.0. The pH range for preparing the resinous products of this invention is thus within the range of 4.0 to 10 depending on whether urea or melamine type resins are prepared.

Heating the solution or the reaction mixture above room temperature during the reaction between the aldehyde and the amino compound and during the reaction between the aldehyde-amino compound condensation product and the salt of the hydroxy aromatic sulfonic acid increases the rate of reaction and is preferred. However, both of these reactions should be carried out below the boiling point of the solution or mixture for best results.

The resinous products of this invention contain aromatic sulfonate residues or groups attached to the resin molecule. Illustrative of such residues are the following:

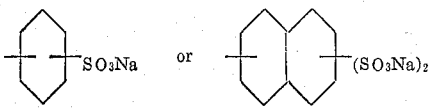

The aromatic ring of such residue is believed to be connected with the amino compound-aldehyde reaction product through an oxygen ether linkage in which the oxygen is attached directly to the aromatic ring at the position formerly occupied by the hydroxy group, or the oxygen is attached to a methylene group on the aromatic ring. The exact mechanism of the reaction between the amino compound-aldehyde condensation product and the salt of the hydroxy aromatic sulfonic acid is not understood but it is believed that the hydroxy group on the aromatic sulfonic acid reacts with one of the terminal

groups of the amino compound-aldehyde condensation product with the splitting off of water, or that the excess aldehyde in the solution reacts with the hydroxy aromatic sulfonic acid to form a side chain on the aromatic ring which terminates in a

group which in turn reacts with one terminal

group of the amino compound-aldehyde condensation product by splitting off water. In any event the final product contains aromatic sulfonate groupings or residues which materially alter the properties of the original amino compound-aldehyde condensation product.

Depending upon the conditions of the reaction, the aldehyde employed and the proportions of the reactants used, it is possible to produce resinous products which are water-soluble or water-insoluble, or which are solid and fusible or gel-like and fusible. It is also possible to produce resinous products which are water-soluble, but which have little or no wet strength imparting properties, and it is also possible to produce resinous products which are water-soluble and highly condensed and which impart a high degree of wet strength to paper products when incorporated therein. The water-soluble resinous products, in general, are suitable for the treatment of textile materials such as cotton or wool yarns and fabrics. The water-soluble or water-insoluble resinous products can be made infusible and insoluble by heating and are useful in such form as cation-exchange materials. The water-soluble and highly condensed products which have been prepared in accordance with the preferred process described below are especially suitable for the treatment of paper pulp in the beater for imparting increased wet strength to paper products prepared therefrom.

A preferred process for preparing water-soluble and highly condensed resins which are suitable for imparting wet strength to paper products is described below. Such resins are prepared by first reacting 1 molecular proportion of urea with from 2 to 3 molecular proportions of formaldehyde, as formalin, in water until a methylolated urea is obtained. Best results are obtained by using 2.2 to 2.5 molecular proportions of formaldehyde. In most instances satisfactory results are obtained in subsequent reactions when the methylolated urea contains from 1.2 to 2 mols of combined formaldehyde. This reaction is carried out at slightly elevated temperatures, for example, at temperatures between about 50° and 70° C. Moreover, the solution should be alkaline during the reaction. Satisfactory results are obtained at a pH between 7.2 and 8.5. For best results it is preferred to maintain the solution at a pH between 7.5 and 8.0. Normally the pH is adjusted at the beginning of the reaction by the addition of a base such as an alkali metal hydroxide or carbonate, for example, sodium hydroxide or carbonate. In some instances the pH may drop as the reaction proceeds and further base is added to maintain the alkalinity of the mixture. The duration of the reaction is primarily dependent upon the pH and temperature of the mixture. In general, the desired degree of methylolation of the urea is obtained within a period of 15 to 120 minutes.

It is necessary to correlate the pH and temperature of the mixture and the duration of the reaction to secure the best results. By increasing the temperature up to 70° C. and by lowering the pH toward 7.2, the reaction rate is increased. A reaction period of 15 minutes is usually satisfactory under such conditions. At lower temperatures and higher pH values a reaction period of 120 minutes may be required.

The solution of methylolated urea which is obtained in accordance with the foregoing procedure is next treated with the water-soluble salt of the hydroxy aromatic sulfonic acid. From 0.05 to 0.5 molecular proportion of the sodium salt or para phenol sulfonic acid, for example, is added to the solution of the methylolated urea for each molecular proportion of urea contained therein. In most instances it is preferred to employ from 0.05 to 0.3 molecular proportion of such salt for each molecular proportion of urea since it is thus possible to obtain superior wet strength resins.

After the addition of the sodium salt of para phenol sulfonic acid or the other hydroxy aromatic sulfonic acids, and while the solution of methylolated urea is still alkaline, the solution is concentrated without appreciably changing the degree of polymerization of the methylolated urea until the solution contains from about 55 to 65% by weight of resin solids. Best results are obtained by concentrating to from 58 to 62% solids content. The solution is generally concentrated to the requisite solids content, without appreciably changing the degree of polymerization of the methylolated urea, by vacuum concentration, or by "flash" concentration either with or without the use of vacuum. The solution is vacuum concentrated by subjecting it to a vacuum of at least 40 millimeters of mercury (absolute) and at a temperature not in excess of 65° C. By using a higher vacuum, that is, less than 15 millimeters of mercury and temperatures close to 65° C. the rate of concentration is increased. Best results have been obtained by subjecting the solution to a vacuum of 5 to 15 millimeters of mercury at a temperature of 55 to 60° C.

The solution is "flash" concentrated by pumping it through a heated pipe, for example a jacketed pipe which is heated by steam, so that a small portion of the solution passing through the pipe from the pump to the outlet end of the pipe is concentrated to the desired solids content in a very short interval of time, for example, from 0.01 to 0.3 second and the solution is then cooled. When using the "flash" concentration procedure for concentrating the solution it is necessary to correlate the temperature to which the solution is heated, the rate of flow and the diameter of the pipe so that the solution will be concentrated within a very short period of time as defined above. Best results have been obtained, from the standpoint of stability of the final product, by employing a vacuum during "flash" concentration, that is, by pumping the solution through a heated pipe which is at least partially evacuated.

By employing the vacuum concentrating or "flash" concentrating procedures as described above, it is possible to concentrate the resin solution to the desired solids content without materially altering or changing the degree of polymerization of the methylolated urea. This is particularly important in the preparation of wet strength resins since any marked change in the degree of polymerization of the methylolated urea at this stage of the process results in final products having inferior wet strength properties. In some instances it may not be necessary to concentrate the solution of methylolated urea to the specified content since such solution may contain the specified quantity of resin solids as prepared.

After the resin solution has been concentrated to the desired solids content as described above, it is acidified, that is, it is rendered acidic by the addition of an acid, for example, a mineral acid such as sulfuric acid, phosphoric acid and the like. The pH of the solution after acidification should be between about 4.5 and 5.5 for best results. The solution is then heated to bring about a reaction between the methylolated urea and the sodium salt of para phenol sulfonic acid. This reaction is generally carried out at a temperature between about 80 and 95° C., care being taken to prevent boiling. It is usually desirable to carry out the reaction using a reflux condenser to avoid loss of water and a stirrer to minimize gel formation on the heat exchange surfaces. The resulting resin condenses as the reaction proceeds and eventually reaches a high state of condensation as is evidenced by a continued rise in the viscosity of the solution. If the condensation of the resin is carried too far a gel-like mass is attained. The rate of condensation is largely dependent on the pH of the solution and the temperature to which the solution is heated, the rate of condensation increasing at higher temperatures and lower pH values. The resin solution is heated at the temperatures and pH values indicated above until the viscosity of the solution at 60% resin solids content is between about 5 and 10 poises as measured by the Gardner-Holdt bubble viscometer. At these viscosities the resin has maximum wet strength properties and is highly condensed.

Further condensation of the resin is substantially prevented or minimized by making the solution alkaline by the addition of a water-soluble base after the solution has reached the desired viscosity. Any water-soluble base which does not precipitate the resin may be used for this purpose including the alkali metal hydroxides or carbonates such as sodium hydroxide or carbonate, or a quaternary ammonium hydroxide such as trimethyl benzyl ammonium hydroxide. The amount of base added should be sufficient to render the solution alkaline or alkaline reacting, and preferably should be sufficient to provide a solution having a pH between about 7.5 and 8.5. It is preferred to make the resin solution alkaline, as described above, before the solution is allowed to cool.

The resin solutions obtained according to the foregoing procedure consist of a water solution of a water-soluble, highly condensed thermosetting resin and contain from about 55 to 65% resin solids. Such solutions are infinitely dilutable and are quite stable when stored at room temperature, and particularly in cold storage at a temperature above the freezing point of the solution. The resin particles in the solution are highly substantive to negatively charged cellulosic substances such as paper pulp fibers in the presence of acids such as mineral acids or aluminum ions, for example, the aluminum ions derived from a solution of alum (aluminum sulfate) in water. This property makes these particular resins particularly suitable for addition to paper pulp in the beater in the presence of acids and/or with alum since a predominant amount of the resin is picked up by or deposited on the paper pulp fibers and only minor amounts of the resin are lost in the white water after the paper forming operation. However, these resins are not only highly substantive, but also have the property of imparting high wet strength to paper products.

These resin solutions may be dried, if desired, for example, by spray drying, vacuum drying, drum drying and the like or by simple evaporation of water. By drying such solutions, it is possible to obtain solid products which are readily soluble in water and which have substantially the same properties as the original resin in solution. By using mild drying conditions, that is, relatively low temperatures, it is possible to form solid products which have the same and, in some instances, higher wet strength properties than the original resin as prepared. Such drying is best carried out by subjecting the solution to a vacuum of at least 40 millimeters of mercury and temperatures below the boiling point of the solution.

The wet strength resins prepared in accordance with the preferred process as hereinbefore described are normally incorporated in paper products by adding them to an aqueous slurry of paper pulp together with acids or alum to render the resin substantive to the paper fiber. The resins are generally employed in an amount sufficient to provide from 0.25 to 5% by weight of resin solids based on the oven dry weight of the paper pulp. Satisfactory results are obtained, in most instances, by using from 1 to 3% by weight of the resin. After the paper pulp has been formed into a paper product such as paper sheeting, the resin is cured in situ in the paper, that is, the resin is rendered insoluble and infusible in the paper product. This curing operation may be performed in various ways. One particularly convenient mode of operation consists in forming a paper sheeting in the customary manner, drying the sheeting on heated rolls and then winding the paper sheeting while it is still warm or hot into rolls. By operating in this manner, the finished rolls, after removal from the paper-making machine, remain warm for several days and sometimes for a week in storage and the resin becomes infusible and insoluble under such conditions. If desired, the curing operation may be carried out by heating the paper at elevated temperatures, for example, at 150° F. to 300° F. until the resin becomes insoluble and infusible. At such temperatures the resin is cured in the paper within a relatively short period of time.

A further understanding of this invention will be obtained from the following specific examples which are intended to further illustrate this invention, but are not intended to limit the scope thereof, parts and percentages being by weight unless otherwise specified.

EXAMPLE I

One molecular proportion of urea and 2.7 molecular proportions of formaldehyde, in the form of a 37% aqueous solution, were stirred together and the pH of the mixture was adjusted between 7.5 and 7.9 with caustic soda. The mixture was then heated, with stirring, at 60 to 65° C. for a period of 60 minutes. After this period of time 0.2 molecular proportion of a mixture of ortho and para phenol sodium sulfonate (which comprised 98% of the para isomer) was added to the solution. The solution was then concentrated until it contained 60% solids by subjecting it to a vacuum of 5 to 15 millimeters of mercury and concurrently heating the solution to a temperature of 55° C. and maintaining the solution at such temperature. The solution was then acidified to a pH of 5 (glass electrode) by the addition of sulfuric acid, after which it was heated to a temperature of 95° C. under reflux, with stirring, until the viscosity was 5 poises as measured with the Gardner-Holdt bubble viscometer. The pH was then adjusted to a pH of 7.5 to 8.0 (Hydrion paper) with caustic soda and the resin solution was then rapidly cooled to room temperature (about 25° C.).

The above resin solution was applied to paper pulp in the beater according to the following procedure. Bleached sulfite pulp was first refined to 350 c. c. TAPPI (Technical Association of the Pulp and Paper Industries) standard freeness at 2% consistency in a laboratory refiner. Quantities of this refined stock sufficient to prepare hand sheets were used. To the refined stock was added a quantity of resin solution at 60% solids sufficient to provide 1.5% of resin solids based on the oven dry pulp solids. The resulting mixture was stirred for 15 minutes and then 3% of alum (aluminum sulfate), based on the oven dry pulp, was added and the whole stirred for an additional 15 minutes. This mixture was made into hand sheets on a Noble-Wood Laboratory sheet machine. These hand sheets were aged in an oven at 105° C. for 4 hours to rapidly cure the resin and develop the wet strength. The sheets were cut into strips 15 millimeters in width and soaked in water for 16 hours. The wet sheets were then tested for wet tensile strength with a Schopper tensile tester. This testing procedure is described in greater detail in TAPPI Testing Method T-456 M-44. The wet strength of the sheets averaged 4.88 pounds per inch as compared to 1.75 pounds per inch for a control hand sheet prepared from the same pulp but without resin treatment.

EXAMPLE II

One molecular proportion of urea and 2.5 molecular proportions of formaldehyde, in the form of a 37% aqueous solution, were stirred together and the pH was adjusted between 7.5 and 8.0 with caustic soda. The mixture was then heated for 1 hour at a temperature of 60 to 70° C., after which 0.065 molecular proportion of the sodium salt of 2-naphthol-3,6 disulfonic acid was added. The resulting solution was subjected to a vacuum of 30 to 40 millimeters of mercury and maintained at a temperature between 40 and 50° C. until it contained 60% resin solids. The pH of the solution was then adjusted to 4.5 with sulfuric acid, after which the solution was heated at 90 to 95° C.

under a reflux condenser and with stirring until the viscosity of the solution had reached 6 poises as measured by the Gardner-Holdt bubble viscometer. This reaction required approximately 1 hour. The pH of the solution was then raised to a pH of 7.5 to 8.0 (as measured by Hydrion paper) by the addition of caustic soda and the solution was then cooled to about 25° C.

The resin solution obtained in the manner described immediately above had good stability in storage at room temperature and was infinitely dilutable with water.

The above resin solution was applied to sulfite paper pulp in the beater using the same pulp and the same procedure described in Example I with the exception that the resin solution was supplied in an amount sufficient to provide 2% resin solids based on the oven dry pulp solids. Hand sheets prepared from the treated pulp were dried for 4 hours at 105° C. to cure the resin and to develop the wet strength of the paper sheet. Strips of the hand sheet, the strips being 15 millimeters wide, were immersed in water for 16 hours and tested for wet tensile strength with a Schopper tensile tester. The wet strength of the sheets averaged 5.0 pounds per inch as compared to 1.75 pounds per inch for a control hand sheet, that is a hand sheet which had not been treated with resin.

EXAMPLE III

Two separate solutions were first prepared as described below:

*Solution 1*

One molecular proportion (126 parts) of melamine and 3.5 molecular proportions (283 parts) of formaldehyde, in the form of a 37% aqueous solution, were slurried by stirring and the pH of the mixture was adjusted to 9.3. The solution was then heated to a temperature between 90 and 95° C. for about 2 to 3 minutes, after which a clear solution was obtained.

*Solution 2*

Thirty-five hundredths (0.35) molecular proportion (93.7 parts) of a mixture of ortho and para phenol sulfonic acids containing 98% of the para isomer, in the form of a 65% solution, was added to 200 parts of water together with 0.35 molecular proportion (30 parts) of sodium hydroxide in the form of a 17 N aqueous solution. The pH of this solution was adjusted to 5 with sulfuric acid and then 0.5 molecular proportion (37.5 parts) of formaldehyde, in the form of a 37% aqueous solution, was added, after which the solution was heated at 90–95° C. for 15 minutes and then cooled to 25° C.

Solution 1 was added to solution 2 and the pH of the resulting solution was adjusted to 8.0 with NaOH. The mixture was then heated at a temperature of 90 to 95° C. for a period of 15 minutes. The pH was adjusted to 9.5 with sodium hydroxide, after which the solution was subjected to a vacuum of 30–35 milimeters of mercury at a temperature of 35–55° C. until it contained 60% resin solids.

This solution was infinitely dilutable with water and was suitable for treating textile fabrics to provide a shrink-resistant finish.

After the solution was allowed to stand over night (about 16 hours) it was heated at 90 to 95° C. for 30 minutes, after which time it had a viscosity of 13 poises as measured by the Gardner-Holdt bubble viscometer. The solution was cooled to 25° C. and diluted to 40% resin solids. The resulting solution was not infinitely dilutable with water, but was suitable for the treatment of textile fabrics.

Various modifications and changes may be made in the processes of this invention and in the starting materials used in the preparation of the resinous products of this invention as will be apparent to those skilled in the art from a consideration of the foregoing description. It is accordingly intended that the scope of this invention be limited only by the scope of the appended claims.

What is claimed is:

1. A process of preparing a nitrogen-containing thermosetting resin which is suitable for imparting wet strength when incorporated in paper products which comprises reacting 1 molecular proportion of urea with from 2 to 3 molecular proportions of formaldehyde in an alkaline aqueous solution at a pH between about 7.2 and 8.5 and at a temperature between about 50 and 70° C. to form a methylolated urea, adding to the resulting solution from 0.05 to 0.5 molecular proportion of a water-soluble salt of a nuclear substituted hydroxy aromatic sulfonic acid containing from 6 to 10 carbon atoms and having one hydroxy group and 1 to 2 sulfonic acid groups, in which acid the hydroxy and sulfonic acid groups are the sole substituents other than carbon and hydrogen, concentrating the resulting solution to a solids content of 55 to 65% by weight without materially changing the degree of polymerization of said methylolated urea, adding an acid to the resulting solution until the pH thereof is between about 4.5 and 5.5, heating the solution at a temperature above about 80° C. but below the boiling point of the solution until the viscosity of the solution at 60% by weight resin solids is between about 5 and 10 poises as measured by the Gardner-Holdt bubble viscometer, and then adding a water-soluble base to the solution until the solution is sufficiently alkaline to minimize further increases in viscosity of the solution.

2. A process substantially according to claim 1, but further characterized in that the water-soluble salt of the hydroxy aromatic sulfonic acid is sodium para phenol sulfonate.

3. A process substantially according to claim 1, but further characterized in that the water-soluble salt of the hydroxy aromatic sulfonic acid is the sodium salt of ortho phenol sulfonic acid.

4. A process substantially according to claim 1, but further characterized in that the water-soluble salt of the hydroxy aromatic sulfonic acid is a water-soluble sodium salt of 2-naphthol 3,6 disulfonic acid.

5. A process of preparing nitrogen-containing thermosetting resins which comprises reacting 1 molecular proportion of an amino compound selected from the group consisting of urea, thiourea, cyanamide, dicyandiamide, guanidine and aminotriazines having at least two primary amino groups and mixtures thereof with from 0.5 to 2 molecular proportions, based on each amino group of said amino compound, of an aldehyde in an aqueous solution having a pH between about 7 and 10 to form a condensate of said amino compound and said aldehyde, adding to the resulting solution from about 0.05 to 0.5 molecular proportion of a water-soluble salt of nuclear substituted hydroxy aromatic sulfonic acid containing from 6 to 10 carbon atoms and having one hydroxyl group and 1 to 2 sulfonic acid groups, in which acid the hydroxyl and sulfonic acid groups are the sole substituents other than hydrogen, adjusting the pH of the resulting solution between 4 and 10 and heating the solution until the condensate in the solution is water-soluble and is capable of increasing the wet tensile strength of paper formed from cellulose fibers treated with said condensate in the presence of a substance selected from the group consisting of aluminum sulfate and mineral acids.

6. A process of preparing nitrogen-containing thermosetting resins which comprises reacting 1 molecular proportion of urea with from about 2 to 3 molecular proportions of an aldehyde in an aqueous solution having a pH between about 7.0 and 8.5 to form a urea-aldehyde condensate, adding to the resulting solution from 0.05 to 0.5 molecular proportion of a water-soluble salt of a nuclear substituted hydroxy aromatic sulfonic acid containing from 6 to 10 carbon atoms and having one hydroxyl group and 1 to 2 sulfonic acid groups, in which acid the hydroxyl group and sulfonic acid groups are the sole substituents other than hydrogen, adjusting the pH of the resulting solution between about 4 and 6, heating the solution at a temperature below the boiling point of the solution until the condensate in the solution is water-soluble and is capable of increasing the wet tensile strength of paper formed from cellulose fibers treated with said condensate in the presence of a substance selected from the group consisting of aluminum sulfate and mineral acids.

7. A process of preparing nitrogen-containing thermosetting resins which comprises reacting 1 molecular proportion of urea with from about 2 to 3 molecular proportions of formaldehyde in an aqueous solution having a pH between about 7.0 and 8.5 to form a methylolated urea, adding to the resulting solution from 0.05 to 0.5 molecular proportion of a water-soluble salt of a nuclear substituted hydroxy aromatic sulfonic acid containing from 6 to 10 carbon atoms and having one hydroxyl group and 1 to 2 sulfonic acid groups, in which acid the hydroxy and sulfonic acid groups are the sole substituents other than hydrogen, concentrating the resulting solution to a solids content of 55 to 65% by weight without materially changing the degree of polymerization of said methylolated urea, adjusting the pH of the solution between about 4 and 6, heating the solution below the boiling point of the solution until the condensate in the solution is water-soluble and the condensate is capable of increasing the wet tensile strength of paper formed from cellulose fibers treated with said condensate in the presence of a substance selected from the group consisting of aluminum sulfate and mineral acids, and adding a water-soluble base to the solution until the solution is sufficiently alkaline to minimize further increases in viscosity of the solution.

8. A process substantially according to claim 7, but further characterized in that the water-soluble salt of the hydroxy aromatic sulfonic acid is the sodium salt of para phenol sulfonic acid.

9. A process substantially according to claim 7, but further characterized in that the water-soluble salt of the hydroxy aromatic sulfonic acid is the sodium salt of 2-naphthol 3,6 disulfonic acid.

10. A process substantially according to claim 7, but further characterized in that the water-soluble salt of the hydroxy aromatic sulfonic acid is the sodium salt of ortho phenol sulfonic acid.

11. A process of preparing nitrogen-containing thermosetting resins which comprises reacting 1 molecular proportion of melamine with from about 0.5 to 2 molecular proportions of formaldehyde, based on each amino group of the melamine, in an aqueous solution having a pH between about 7.0 and 10.0, to form a methylolated melamine, adding from about 0.05 to 0.5 molecular proportion of a water-soluble salt of a nuclear substituted hydroxy aromatic sulfonic acid containing from 6 to 10 carbon atoms and having one hydroxyl group and 1 to 2 sulfonic acid groups, in which acid the hydroxyl group and sulfonic acid groups are the sole substituents other than hydrogen, concentrating the resulting solution to a solids content of about 55 to 65% by weight without materially changing the degree of polymerization of said methylolated melamine, heating the resulting solution while maintaining the pH of the solution between about 7.0 and 10.0 until the condensate in the solution is water-soluble and is capable of increasing the wet tensile strength of paper formed from cellulose fibers treated with said condensate in the presence of a substance selected from the group consisting of aluminum sulfate and mineral acids.

12. A process of preparing paper products having a high wet strength which comprises treating an aqueous slurry of paper pulp in the presence of a substance selected from the group consisting of acids and alum with a water-soluble and highly condensed reaction product of urea, formaldehyde and a water-soluble salt of a nuclear substituted hydroxy aromatic sulfonic acid containing from 6 to 10 carbon atoms and having one hydroxyl group and 1 to 2 sulfonic acid groups, in which acid the hydroxyl group and sulfonic acid groups are the sole substituents other than hydrogen, said reaction product being supplied in an amount sufficient to provide from 0.25 to 5% by weight of said reaction product based on the oven dry weight of the paper pulp in said slurry; forming said slurry into a paper product and then converting said reaction product in situ to the insoluble and infusible state, said water-soluble and highly condensed reaction product having been prepared by first reacting 1 molecular proportion of urea with from 2 to 3 molecular proportions of formaldehyde in an aqueous solution having a pH between about 7 and 10, to form a methylolated urea, adding from 0.05 to 0.5 molecular proportion of a water-soluble salt of said hydroxy aromatic sulfonic acid, concentrating the resulting solution to a solids content of 55 to 65% by weight without materially changing the degree of polymerization of said methylolated urea, adjusting the pH of the solution between about 4 and 6 and heating the solution below the boiling point of the solution until the viscosity of the solution at 60% by weight resin solids is between about 5 and 10 poises as measured by the Gardner-Holdt bubble viscometer.

13. A nitrogen-containing thermosetting resin comprising the condensation product prepared in accordance with the process of claim 5.

14. A nitrogen-containing thermosetting resin comprising the condensation product prepared in accordance with the process of claim 6.

15. A nitrogen-containing thermosetting resin comprising the condensation product prepared in accordance with the process of claim 7.

16. A nitrogen-containing thermosetting resin comprising the condensation product prepared by first reacting 1 molecular proportion of urea with from about 2 to 3 molecular proportions of formaldehyde in an aqueous solution having a pH between about 7.0 and 8.5 to form a methylolated urea, adding to the resulting solution from 0.05 to 0.3 molecular proportion of the sodium salt of para phenol sulfonic acid, concentrating the resulting solution to a solids content of 55 to 65% by weight without materially changing the degree of polymerization of said methylolated urea, adjusting the pH of the solution between about 4 and 6, heating the solution below the boiling point of the solution until the condensate in the solution is water-soluble and is capable of increasing the wet tensile strength of paper formed from cellulose fibers treated with said condensate in the presence of a substance selected from the group consisting of aluminum sulfate and mineral acids, and adding a water-soluble base to the solution of the condensate until the solution is sufficiently alkaline to minimize further increases in viscosity of the solution.

17. A nitrogen-containing thermosetting resin comprising the condensation product prepared by first reacting 1 molecular proportion of urea with from about 2 to 3 molecular proportions of formaldehyde in an aqueous solution having a pH between about 7.0 and 8.5 to form a methylolated urea, adding to the resulting solution from 0.05 to 0.3 molecular proportion of the sodium salt of 2-naphthol 3,6 disulfonic acid, concentrating the resulting solution to a solids content of 55 to 65% by weight without materially changing the degree of polymerization of said methylolated urea, adjusting the pH of the solution between about 4 and 6, heating the solution below the boiling point of the solution until the condensate in the solution is water-soluble and is capable of increasing the wet tensile strength of paper formed from cellulose fibers treated with said condensate in the presence of a substance selected from the group consisting of aluminum sulfate and mineral acids, and adding a water-soluble base to the solution of the condensate until the solution is sufficiently alkaline to minimize further increases in viscosity of the solution.

18. A nitrogen-containing thermosetting resin comprising the condensation product prepared by first reacting 1 molecular proportion of urea with from about 2 to 3 molecular proportions of formaldehyde in an aqueous solution having a pH between about 7.0 and 8.5 to form a methylolated urea, adding to the resulting solution from 0.05 to 0.3 molecular proportion of the sodium salt of ortho phenol sulfonic acid, concentrating the resulting solution to a solids content of 55 to 65% by weight without materially changing the degree of polymerization of said methylolated urea, adjusting the pH of the solution between about 4 and 6, heating the solution below the boiling point of the solution until the condensate in the solution is water-soluble and is capable of increasing the wet tensile strength of paper formed from cellulose fibers treated with said condensate in the presence of a substance selected from the group consisting of aluminum sulfate and mineral acids, and adding a water-soluble base to the solution of the condensate until the solution is sufficiently alkaline to minimize further increases in viscosity of the solution.

19. A nitrogen-containing thermosetting resin comprising the condensation product prepared according to the process of claim 1.

20. A nitrogen-containing thermosetting resin comprising the condensation product prepared according to the process of claim 11.

GEORGE E. NILES.

REFERENCES CITED

The following references are of record in the file of this patent:

UNITED STATES PATENTS

| Number | Name | Date |
| --- | --- | --- |
| 1,841,840 | Muller | Jan. 19, 1932 |
| 2,127,068 | Muller | Aug. 16, 1938 |

FOREIGN PATENTS

| Number | Country | Date |
| --- | --- | --- |
| 188,794 | Switzerland | Apr. 16, 1937 |
| 388,475 | Great Britain | Mar. 2, 1933 |
| 822,349 | France | Sept. 13, 1937 |
| 852,875 | France | Nov. 9, 1939 |